June 24, 1958 A. ROSS 2,839,985
WINDSHIELD HEADER VENT
Filed Jan. 4, 1954

INVENTOR
Arthur Ross
BY
Paul Fitzpatrick
ATTORNEY

United States Patent Office 2,839,985
Patented June 24, 1958

2,839,985
WINDSHIELD HEADER VENT

Arthur Ross, Detroit, Mich., assignor to General Motors Corporation, Detroit, Mich., a corporation of Delaware Application January 4, 1954, Serial No. 401,968

4 Claims. (Cl. 98—2)

My invention relates to the ventilation of automobile bodies and primarily to improving the ventilation of bodies of the convertible or roadster type.

Automobiles with open bodies require for the comfort of the occupants that the windshield direct the air away from the heads and faces of the driver and front seat passengers. Modern well-raked windshields do this quite well; in fact, so thoroughly that at times the occupants of the car may desire more fresh air in their faces than is available because of the deflection of the air away from them by the windshield.

My invention is directed to providing a reasonable and comfortable quantity of fresh air at the face or chest level of the front seat passengers in an open motor car; which, of course, includes an automobile in which the top may be lowered and is lowered at the time in question. According to the preferred embodiment of the invention, this result is obtained by providing ventilators in the upper header of the windshield which deflect a reasonable quantity of air downwardly to cool and refresh the driver and passenger.

The nature of the invention and the advantages thereof will be more clearly apparent from the succeeding specification and the accompanying drawings, in which Fig. 1 is a partial plan view of a convertible automobile;

Figure 1:
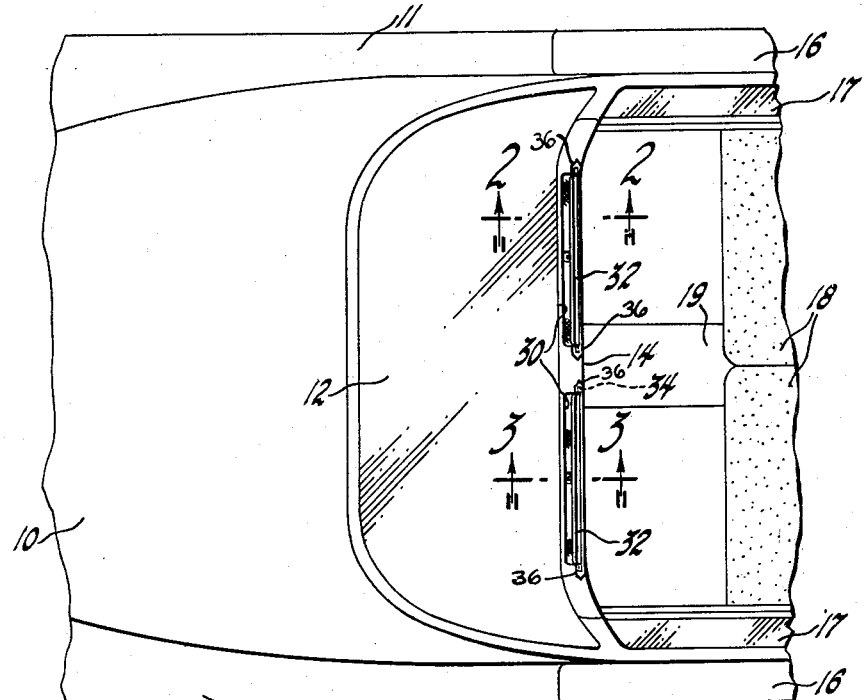

Referring first to Fig. 1, an automobile may include a hood 10, fenders 11, a windshield 12 having an upper header 14, doors 16 within which may be mounted window glass 17, seats 18, and a floor including a drive shaft housing 19.

The upper edge of the windshield glass 12 is retained in a resilient channel 21 mounted in a frame 22 and held therein by a molding 23 secured in any suitable way (not shown). A header mounted on the upper windshield frame 22 comprises a top plate 26 and a bottom plate 27. A metal strip 28 to which the plates 26 and 27 are brazed reinforces the rear edge of the header.

Ventilating openings 30 are provided by openings in both the plates 26 and 27 on each side of the car. A screen 31 is welded or brazed across the opening 30.

The opening 30 may be closed by cover plates or deflectors 32 each of which is mounted on two arms 33 from which extend pins 34 by which the plates are hingedly mounted. Pins 34 extend into blocks 36 inserted between the plates 26 and 27, the strip 28 being interrupted to provide for mounting of the block 36 at the ends of the ventilators. Screws 36' threadedly engage plate 27 to hold the blocks 36 in place. A reinforcing plate 32' is brazed to the deflector 32.

The plate 32 is raised and lowered by an actuator 37 and a link 38 pivotally connected to the actuator and plate. Actuator 37 is rotatable on pin 39 mounted in a housing 40, which housing is a formed plate welded to a bezel 41 which is mounted on the lower surface of the header 14 by screws 42 and 43. The actuator may be moved from the position of Fig. 3, in which the plate 32 is raised, to the position of Fig. 4, in which it is lowered, by a thumb handle 44 projecting from the body 37.

The thumb lever 44 extends through a slot 46 in the bezel which limits its movement. The link 38 enters clevises 47 and 48 on the parts 32 and 37 respectively and is pivoted to these parts by pins extending through the arms of the clevises.

An overcenter spring 51 acts on the actuator 37 to bias it toward either of its limiting positions of movement. This spring is mounted on a spindle 52 which extends through an opening in the housing 40 and the spring bears against the housing and against a fitting 53 at the other end of the spring which is pivoted to a clevis 54 of the actuator 37. The operation of this overcenter mechanism will be obvious from Figs. 3 and 4.

The fabric 60 of the convertible top is fixed in any suitable way to a top heater 61 or front cross bar comprising upper and lower plates 63 and 64.

The detailed structure of the top header and the manner in which the fabric is fixed to it, as well as the arrangement for securing the top header to the windshield header, are immaterial to the invention and will not be further discussed.

Figure 2:
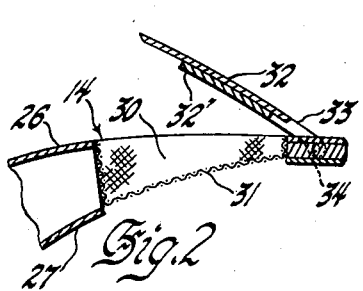
Fig. 2 is a fragmentary sectional view of the header bar of the windshield taken on the plane indicated by the line 2—2 in Fig. 1.
Figure 3:
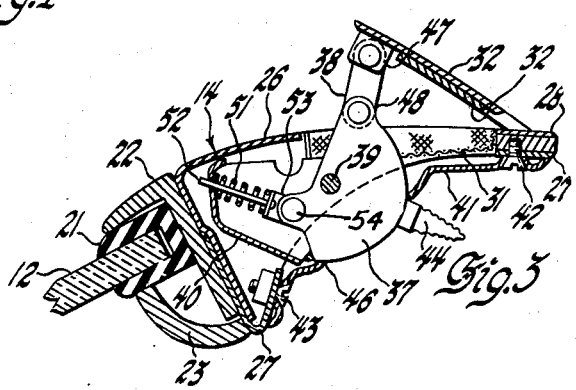
Fig. 3 is a sectional view through the windshield header and ventilator operating mechanism taken on the plane indicated by the line 3—3 in Fig. 1.
Figure 4:
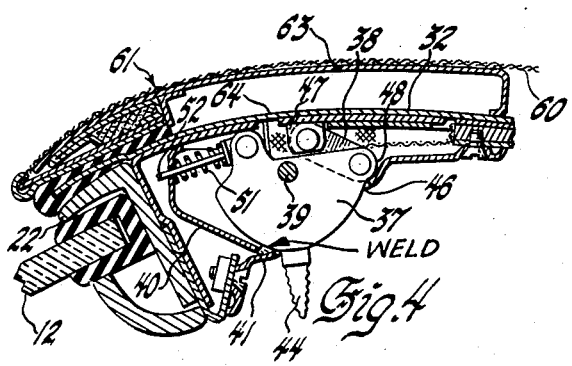
Fig. 4 is a view taken on the same plane as Fig. 3 with the ventilator closed and the automobile top in position.
Figure 5:
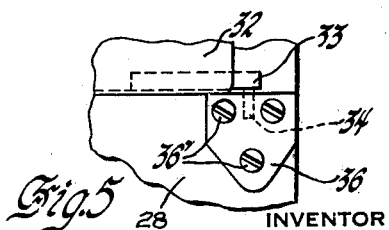
Fig. 5 is a detail.

As will be apparent, the ventilator folds down out of the way when the top is raised and, when the top is lowered, the ventilator may either be closed as in Fig. 4 or it may be open as in Figs. 2 and 3. When it is open, the plate 32 acts as an air scoop or deflector to direct air downwardly toward the face level of passengers in the car, which is below the level of the windshield header.

It is thus possible to provide immunity from blasts or drafts for the occupants of an open car and yet make it possible for them to have a satisfactory and comfortable amount of fresh air in hot weather by virtue of the invention.

The description herein of the details of the preferred embodiment of the invention for the purpose of explaining the principles thereof is not to be construed as limiting the invention, as many modifications in structure may be made within the scope of the invention by the exercise of skill in the art.

I claim:

1. In a vehicle, in combination, a passenger compartment, a windshield ahead of the passenger compartment including a windshield header on the windshield at the upper edge thereof having an air passage therethrough opening into the passenger compartment and a convertible top disposable over the passenger compartment and engageable and disengageable with the windshield header, the convertible top engaging the windshield header in such relation as to overlay and close the said passage.

2. In a vehicle, in combination, a passenger compartment, a windshield ahead of the passenger compartment including a windshield header on the windshield at the upper edge thereof having an air passage therethrough opening into said passenger compartment, a convertible top disposable over the passenger compartment and engageable and disengageable with the windshield header, and optionally operable valve means for opening and closing the said passage with the convertible top disengaged from the windshield header, the convertible top engaging the windshield header in such relation as to overlay and close the said passage.

3. In a vehicle, in combination, a passenger compartment, a windshield ahead of the passenger compartment including a windshield header on the windshield at the upper edge thereof having an air passage therethrough opening into the passenger compartment, a convertible top disposable over the passenger compartment and engageable and disengageable with the windshield header, and optionally operable means on the windshield header for directing air downwardly into the passenger compartment with the convertible top disengaged from the windshield header including a wind deflector movable relative to the air passage, the convertible top engaging the windshield header in such relation as to overlay and close the said passage.

4. In a vehicle, in combination, a passenger compartment, a windshield ahead of the passenger compartment including a windshield header on the windshield at the upper edge thereof, a convertible top movable to a raised position covering the passenger compartment and to a lowered position exposing the passenger compartment, the convertible top being engageable in the raised position and disengageable in the lowered position with the windshield header, the windshield header having at the upper edge thereof an air passage opening downwardly into the passenger compartment from the exterior thereof with the top lowered, the convertible top in the raised position engaging the windshield header and overlaying the air passage to interrupt air flow therethrough.

References Cited in the file of this patent

UNITED STATES PATENTS

| | | |
|---|---|---|
| 1,567,438 | Heine | Dec. 29, 1925 |
| 1,626,893 | Twyman et al. | May 3, 1927 |
| 1,969,935 | Lintern et al. | Aug. 14, 1934 |
| 2,043,672 | Morrison | June 9, 1936 |
| 2,049,701 | Guyot | Aug. 4, 1936 |
| 2,159,516 | Ball | May 23, 1939 |
| 2,210,592 | Lintern et al. | Aug. 6, 1940 |
| 2,631,518 | Brandenburg | Mar. 17, 1953 |